United States Patent
Arnold et al.

(10) Patent No.: US 9,086,146 B2
(45) Date of Patent: Jul. 21, 2015

(54) METHOD FOR THE OPERATION OF A TRANSMISSION DEVICE IN A VEHICLE DRIVE TRAIN

(75) Inventors: Jorg Arnold, Immenstaad (DE); Georg Mihatsch, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 83 days.

(21) Appl. No.: 13/991,697

(22) PCT Filed: Nov. 8, 2011

(86) PCT No.: PCT/EP2011/069580
§ 371 (c)(1),
(2), (4) Date: Jun. 5, 2013

(87) PCT Pub. No.: WO2012/079846
PCT Pub. Date: Jun. 21, 2012

(65) Prior Publication Data
US 2013/0253788 A1   Sep. 26, 2013

(30) Foreign Application Priority Data
Dec. 14, 2010   (DE) .......................... 10 2010 063 029

(51) Int. Cl.
*F16H 61/16*   (2006.01)
*F16H 61/686*   (2006.01)
(Continued)

(52) U.S. Cl.
CPC ................. *F16H 61/68* (2013.01); *F16H 3/66* (2013.01); *F16H 61/16* (2013.01); *F16H 61/686* (2013.01);
(Continued)

(58) Field of Classification Search
CPC ....... F16H 61/16; F16H 61/686; F16H 61/68; F16H 3/66
USPC ................................................. 701/60, 64, 66
See application file for complete search history.

(56) References Cited

U.S. PATENT DOCUMENTS 4,722,247 A * 2/1988 Shindo et al. ................. 477/152
6,357,289 B1   3/2002 Futawatari
(Continued)

FOREIGN PATENT DOCUMENTS

DE   100 39 922 A1   4/2001
DE   101 20 899 A1   10/2002
(Continued)

OTHER PUBLICATIONS

German Search Report Corresponding to 10 2010 063 027.6 mailed Oct. 10, 2011.
(Continued)

*Primary Examiner* — Fadey Jabr
*Assistant Examiner* — Aaron L Troost
(74) *Attorney, Agent, or Firm* — Davis & Bujold, P.L.L.C.; Michael J. Bujold

(57) ABSTRACT

A method of shifting a vehicle drive-train transmission having frictional and interlocking shifting elements which are engageable to obtain various gears. When shifting from a current gear to a target gear, in which the interlocking shifting element is engaged, if after the shift starts it becomes necessary to engage the current gear in the transmission while engaging the interlocking shifting element, a current operating condition of the interlocking shifting element is determined. If the current operating condition of the interlocking shifting element indicates that engagement can be interrupted and the interlocking shifting element can be disengaged, the interlocking shifting element is disengaged. If the current operating condition of the interlocking shifting element indicates that engagement of the interlocking shifting element has to be carried out and the interlocking shifting element engaged, then the interlocking shifting element is engaged and/or the force flow in the transmission device is interrupted.

20 Claims, 2 Drawing Sheets

(51) Int. Cl.
*F16H 3/66* (2006.01)
*F16H 61/68* (2006.01)
F16H 59/46 (2006.01)
F16H 59/68 (2006.01)
F16H 3/44 (2006.01)

(52) U.S. Cl.
CPC ..... *F16H 2003/442* (2013.01); *F16H 2059/462* (2013.01); *F16H 2059/6807* (2013.01); *F16H 2200/2064* (2013.01); *F16H 2200/2094* (2013.01)

(56) References Cited

U.S. PATENT DOCUMENTS

| | | | |
|---|---|---|---|
| 7,395,729 B2* | 7/2008 | Heinrich | 74/335 |
| 7,789,792 B2 | 9/2010 | Kamm et al. | |
| 8,257,215 B2 | 9/2012 | Borntraeger | |
| 8,394,000 B2 | 3/2013 | Popp et al. | |
| 8,398,522 B2 | 3/2013 | Bauknecht et al. | |
| 2002/0035013 A1* | 3/2002 | Saito | 477/120 |
| 2004/0152563 A1 | 8/2004 | Dreibholz et al. | |
| 2005/0029023 A1* | 2/2005 | Takami et al. | 180/65.3 |
| 2011/0263380 A1 | 10/2011 | Cuppers et al. | |
| 2011/0284335 A1 | 11/2011 | Arnold et al. | |
| 2011/0301819 A1 | 12/2011 | Arnold et al. | |
| 2012/0022752 A1 | 1/2012 | Arnold et al. | |
| 2012/0029778 A1* | 2/2012 | Arnold et al. | 701/61 |
| 2012/0037472 A1 | 2/2012 | Rosemeier et al. | |
| 2012/0135838 A1 | 5/2012 | Cuppers et al. | |

FOREIGN PATENT DOCUMENTS

| | | |
|---|---|---|
| DE | 10 2005 002 337 A1 | 8/2006 |
| DE | 10 2007 005 438 A1 | 8/2008 |
| DE | 10 2008 000 254 A1 | 8/2008 |
| DE | 10 2008 000 209 A1 | 8/2009 |
| DE | 10 2008 000 429 A1 | 9/2009 |
| DE | 10 2008 001 566 A1 | 11/2009 |
| DE | 10 2008 001 567 A1 | 11/2009 |
| DE | 10 2008 040 918 A1 | 2/2010 |
| DE | 10 2008 043 676 A1 | 5/2010 |
| DE | 10 2008 054 635 A1 | 6/2010 |
| DE | 10 2009 000 252 A1 | 7/2010 |
| DE | 10 2009 000 254 A1 | 7/2010 |
| DE | 10 2009 002 203 A1 | 10/2010 |
| DE | 10 2009 002 205 A1 | 10/2010 |
| DE | 10 2009 002 206 A1 | 10/2010 |
| DE | 10 2009 002 661 A1 | 10/2010 |
| DE | 10 2009 017 226 A1 | 10/2010 |
| DE | 10 2009 026 545 A1 | 12/2010 |
| DE | 10 2009 028 305 A1 | 2/2011 |
| EP | 1 705 406 A1 | 9/2006 |
| EP | 1 752 689 A2 | 2/2007 |
| EP | 1 767 829 A2 | 3/2007 |
| WO | 2006/074707 A1 | 7/2006 |
| WO | 2010/081820 A1 | 7/2010 |
| WO | 2010/115806 A1 | 10/2010 |
| WO | WO 2010/115808 A1 * | 10/2010 |

OTHER PUBLICATIONS

German Search Report Corresponding to 10 2010 063 029.2 mailed Jun. 24, 2011.
German Search Report Corresponding to 10 2010 063 028.4 mailed Jun. 22, 2011.
International Search Report Corresponding to PCT/EP2011/069581 mailed Dec. 30, 2011.
International Search Report Corresponding to PCT/EP2011/069580 mailed Dec. 30, 2011.
International Search Report Corresponding to PCT/EP2011/069555 mailed Feb. 2, 2012.
Written Opinion Corresponding to PCT/EP2011/069581 Dec. 30, 2011.
Written Opinion Corresponding to PCT/EP2011/069580 Dec. 30, 2011.
Written Opinion Corresponding to PCT/EP2011/069555 mailed Feb. 2, 2012.
International Preliminary Report Concerning Patentability Corresponding to PCT/EP2011/069580 mailed Mar. 19, 2013.

* cited by examiner

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |

METHOD FOR THE OPERATION OF A TRANSMISSION DEVICE IN A VEHICLE DRIVE TRAIN

This application is a National Stage completion of PCT/EP2011/069580 filed Nov. 8, 2011, which claims priority from German patent application serial no. 10 2010 063 029.2 filed Dec. 14, 2010.

FIELD OF THE INVENTION

The invention concerns a method for operating a transmission device in a vehicle drive-train.

BACKGROUND OF THE INVENTION

From DE 10 2005 002 337 A1 a transmission device designed as an 8-gear multi-step transmission is known, which comprises frictional shifting elements such as disk clutches and disk brakes. When a shift demand is made for a gearshift in the transmission device, at least one frictional shifting element which is engaged in order to obtain the actual gear currently engaged in the transmission device has to be disengaged out of the force flow of the transmission device, whereas at least one other frictional shifting element, which is disengaged from the force flow of the transmission device while the actual gear is currently engaged in the transmission device, has to be engaged in the force flow of the transmission device in order to obtain the required gear.

During this, with increasing shifting time the torque transmitted by the frictional shifting element engaged in the force flow in order to obtain the current actual gear of the transmission device is transferred to a greater or lesser extent to the frictional shifting element that has to be engaged in the force flow of the transmission device in order to obtain the required target gear, while the torque transmitted by the shifting element to be disengaged decreases.

Disadvantageously, frictional shifting elements in the open operating condition give rise to drag torques which impair the overall efficiency of an automatic transmission to an undesired extent.

For that reason transmission devices such as that known from DE 10 2008 000 429 A1 are to an increasing extent designed, besides frictional shifting elements, also with interlocking shifting elements in the area of which no drag torques that impair the overall efficiency of a transmission device occur.

In that case, however, it must be borne in mind that interlocking shifting elements can only be shifted when close to their synchronous point from an open operating condition, in which no torque can be transmitted by the interlocking shifting element, to their closed operating condition, in which the full torque applied can be transmitted by the interlocking shifting element. In addition, interlocking shifting elements engaged in the force flow of a transmission device can only be disengaged from the force flow by means of low shifting forces when they are close to their load-free operating condition. In contrast to frictional shifting elements, both for the synchronization of interlocking shifting elements and also to change interlocking shifting elements to their load-free condition, additional constructional devices are needed in order to enable shifts in transmission devices that involve at least one interlocking shifting element to be carried out within desirable shifting times. In addition, with the last-described transmission devices made with interlocking shifting elements as well, when the previously initiated gearshift from the current gear toward the target gear has to be interrupted, the possibility also exists that the interlocking shifting element involved in the shift cannot be changed to its operating condition required for obtaining the currently engaged gear, i.e. to its open or to its closed operating condition, for example because of the torque applied.

In methods known from practice for operating such transmission devices, if it becomes necessary to interrupt the shift currently in progress it is usual to change back into the currently engaged gear. However, in the case of gearshifts during which, to obtain the required target gear, interlocking shifting elements have to be opened or closed, this is not possible at any time during the shift since when closing, due to the torque build-up interlocking shifting elements can no longer be opened from a certain time-point onward or, during an opening phase after a complete release of the interlock in the area of the interlocking shifting element, they can no longer be changed to their closed operating condition without an additional synchronization phase. This means that after the passing of the time-points, hereinafter called the points-of-no-return and which are characteristic for various gearshift types, a shift that has already begun in the direction toward the required target gear can no longer be interrupted without changing the transmission device to an undefined operating condition.

SUMMARY OF THE INVENTION

Thus, the purpose of the present invention is to provide a method for operating a transmission device of a vehicle drive-train, comprising a plurality of frictional shifting elements and at least one interlocking shifting element, by means of which undefined transmission conditions in the area of a transmission device can be avoided if it becomes necessary to interrupt a gearshift currently in progress, starting from a gear currently engaged in the transmission device in the direction toward a target gear.

In the method according to the invention for operating a transmission device of a vehicle drive-train, the transmission comprising a number of frictional shifting elements and at least one interlocking shifting element, which have to be engaged or disengaged in order to obtain various gears, when a gearshift is required from a current gear to a target gear, to carry out which the at least one interlocking shifting element has to be engaged, and if thereafter it becomes necessary to engage the current gear in the transmission device during a closing phase of the interlocking shifting element initiated by the previous demand for engaging the target gear, a current operating condition of the interlocking shifting element is determined, and if a current operating condition of the interlocking shifting element is determined starting from which the closing phase can be interrupted and the interlocking shifting element can be disengaged, the interlocking shifting element is disengaged, whereas if a current operating condition of the interlocking shifting element is determined starting from which the closing phase of the interlocking shifting element has to be completed and the interlocking shifting element closed, then the interlocking shifting element is engaged and/or the force flow in the transmission device is interrupted.

In this way it is ensured in a simple manner that during upshifts or downshifts, in a transmission device, depending on the progress in time of the required gearshift starting from the currently engaged gear toward the required target gear, an interruption of the required gearshift is possible and, if the point-of-no-return has passed, the gearshift can no longer reasonably be interrupted. Thus, with the procedure according to the invention undefined transmission conditions in the area of a transmission device are avoided with little actuation effort.

If a current operating condition of the interlocking shifting element is determined, starting from which the closing phase of the interlocking shifting element has to be completed and the interlocking shifting element closed, the force flow in the area of the transmission device is interrupted and the transmission device is changed to a defined and safe operating condition in which the interlocking shifting element is in an essentially load-free operating condition, for example such that the interlocking shifting element can safely be changed with small shifting forces to its open operating condition, or such that a completion of an already initiated closing process of the interlocking shifting element does not lead to an undefined operating condition of the transmission device.

The characteristics specified in the following example embodiments of the object according to the invention are in each case, whether considered in isolation or in any combination with one another, suitable as further developments of the object of the invention. In relation to the further development of the object according to the invention, the respective combinations of characteristics have no restrictive force, but rather, are described only as examples.

BRIEF DESCRIPTION OF THE DRAWINGS

Further advantages and advantageous further developments of the invention emerge from the claims and from the example embodiments whose principle is described with reference to the drawings, which show:

DETAILED DESCRIPTION OF THE PREFERRED EMBODIMENTS

Figures 1, 2:
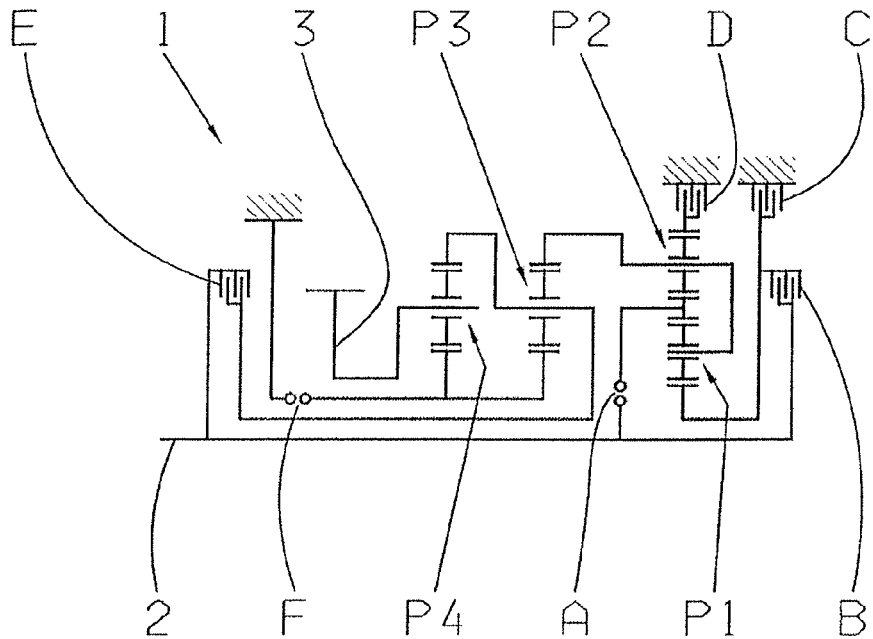
FIG. 1: A gearset layout of a transmission device.
FIG. 2: A table showing the shifting logic of the transmission device shown in FIG. 1.

FIG. 1 shows a gearwheel layout of a transmission device 1 or multi-step transmission, which is basically known from DE 10 2008 000 429 A1. The transmission device 1 comprises a drive input shaft 2 and a drive output shaft 3, the latter in its condition as fitted in the vehicle being connected to a drive output of the vehicle, whereas the drive input shaft 3 is functionally connected to a drive engine.

Furthermore, the transmission device 1 comprises four planetary gearsets P1 to P4, wherein the first and second planetary gearsets P1, P2, which are preferably designed as minus planetary gearsets, form a shiftable intermediate gear system whereas the third and fourth planetary gearsets P3 and P4 form the main gear system. The transmission device 1 also comprises six shifting elements A to F, of which the shifting elements C, D and F are in the form of brakes and the shifting elements A, B and E are shifting clutches.

With the shifting elements A to F, as shown in the shifting logic scheme represented in detail in FIG. 2 nine forward gears "1" to "9" and one reversing gear "R" can be engaged selectively, such that to produce a force flow through the transmission device 1 in each case three shifting elements at a time have to be changed to or kept in a closed operating condition.

In this case the shifting elements A and F are designed as interlocking shifting elements without any additional synchronization, in order, during the operation of the transmission device 1, to reduce drag torques caused by open frictional shifting elements by comparison with transmission devices made using frictional shifting elements alone. Since in general interlocking shifting elements can only be changed from an open to a closed operating condition within a very narrow range of speed differences close to their synchronous speed, without additional constructional measures the interlocking shifting element that has to be engaged is synchronized by appropriate actuation of the respective shifting elements involved in the gearshift. This applies both for traction and thrust shifts, so the interlocking shifting elements can be in the form of claw clutches designed with or without additional synchronization means.

The mode of action of the method according to the invention will now be explained in detail with reference to the operating condition variations over time t of a number of operating parameters of the transmission device 1 of FIG. 1, shown in detail in FIG. 3. The method according to the invention can be used both for the monitoring and actuation of the interlocking shifting element F during a required gearshift starting from the fifth gear "5" toward the fourth gear "4", to carry out which the frictional shifting element B has to be disengaged and the interlocking shifting element F engaged, and also for the monitoring and actuation of the interlocking shifting element A during a required gearshift starting from the eighth gear "8" toward the seventh gear "7", to carry out which the frictional shifting element C has to be disengaged and the interlocking shifting element A engaged.

For simplicity, the procedure according to the invention will only be described in detail below for the interlocking shifting element F, the proposed sequence corresponding to the sequence applicable for the actuation and monitoring of the interlocking shifting element A during a required gearshift from the eighth gear "8" toward the seventh gear "7".

At a time T1 the fifth gear "5" or the eighth gear "8" for forward driving is engaged in the transmission device 1. At time T1 a demand is made for a gearshift starting from the currently engaged actual gear "5" or "8" toward the fourth gear "4" or the seventh gear "7" for forward driving, namely the respective target gear, for which, respectively, the frictional shifting element B or the shifting element C has to be opened and at the same time the interlocking shifting element F or the shifting element A has to be changed from its open operating condition to its closed operating condition.

Figure 3:
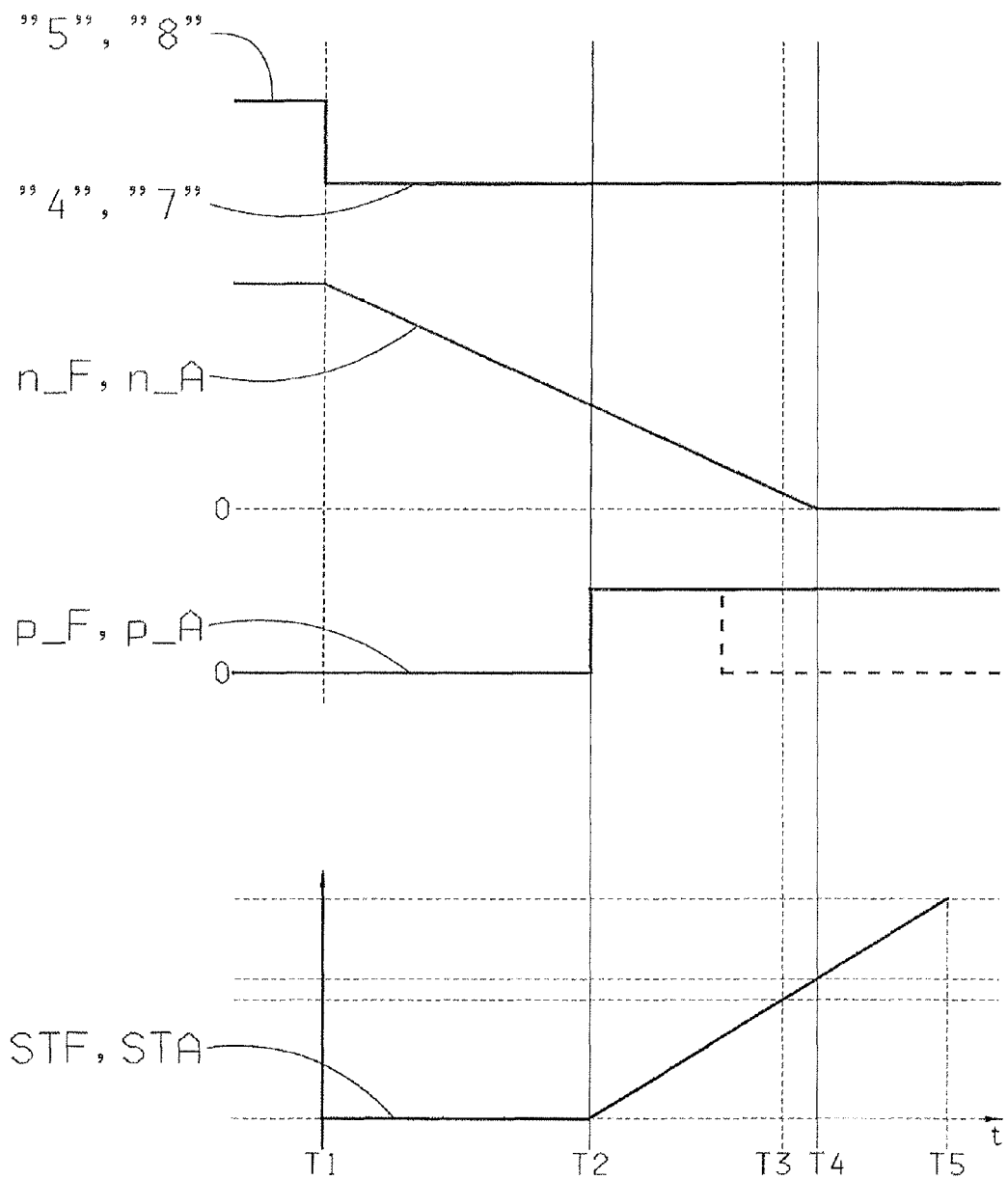
FIG. 3: A number of variations of various operating parameters of the transmission device of FIG. 1 during the implementation of a required gearshift, at the same time as a demand for the gearshift to be interrupted.

The respective gear currently engaged or the gear to be engaged in the transmission device 1 is shown in FIG. 3 by the line SF or SA, whose course before time T1 is at the level of the fifth gear "5" or the eighth gear "8" and at time T1 jumps abruptly to the level of the fourth gear "4" or the seventh gear "7" for forward driving and, without any further shift command, remains at that level as shown in detail in FIG. 3.

In addition a variation of a rotational speed difference n_F or n_A, respectively, between the shifting element halves of the interlocking shifting element F or the interlocking shifting element A is plotted as a function of time t. At time T1, when the frictional shifting element B or the frictional shifting element C is still fully closed and the interlocking shifting element F or the shifting element A is in its fully open operating condition so that the fifth gear "5" or the eighth gear "8" is engaged, the speed difference n_F or n_A is at a speed level equivalent to the synchronous speed of the currently engaged actual gear ratio of the transmission input speed of the transmission device 1.

From time T1, at which the command for a gearshift starting from the current gear "5" toward the target gear "4" is issued, the transmission capacity of the frictional shifting element B is reduced by a corresponding reduction of its actuating pressure, whereby the speed difference n_F in the area of the interlocking shifting element F falls towards zero. At a further time T2 later than time T1 an actuating pressure p_F of the interlocking shifting element F or an actuating pressure p_A of the interlocking shifting element A is increased abruptly from the open pressure level to a closing pressure level, in order to change the interlocking shifting element F or the shifting element A from its open operating condition to its closed operating condition in accordance with the gearshift or downshift from the fifth gear "5" or the eighth gear "8" toward the fourth gear "4" or the seventh gear "7", respectively. The abrupt increase of the gear pressure p_F or p_A of the interlocking shifting element F or shifting element A marks the beginning of a closing phase of the interlocking shifting element F or the shifting element A, during which an interlock is produced between the two shifting element halves by a relative movement in the axial direction between the shifting element halves.

The current relative positions between the two shifting element halves of the interlocking shifting element F or the shifting element A, respectively, are monitored by a respective position sensor device associated with the interlocking shifting element F or the interlocking shifting element A, by means of which in each case a current axial position of the shifting element halves relative to one another can be determined.

Reducing the actuating pressure p_F or p_A brings about a displacement of one of the shifting element halves of the interlocking shifting element F or A toward the other shifting element half, which is designed not to be displaced. The current position of the displaceable shifting element half of the interlocking shifting element F or A is depicted by the variation STF or STA shown graphically in FIG. 3, wherein before time T2 the displaceable shifting element half of the interlocking shifting element F or A is in its first end position STF1 or STA1, which is equivalent to the fully open operating condition of the interlocking shifting element F or A. From time T2 the displaceable shifting element half of the interlocking shifting element F or A is pushed, due to the actuating pressure p_F or p_A applied, in the direction toward its second end-stop STF2 or STA2, which is a position of the displaceable shifting element half equivalent to the fully closed operating condition of the interlocking shifting element F or A.

At a time T3 the interlocking shifting element F is an operating condition beyond which the closing phase of the interlocking shifting element F can no longer be interrupted without producing an undefined operating condition in the area of the transmission device 1, even though at that time no interlock has yet been produced in the area of the interlocking shifting element F.

This results from the fact that by virtue of its design the hydraulic actuating system of the transmission device 1 provided for actuating the shifting elements A to F has a certain reaction time until a change of the actuation strategy of the shifting elements is implemented. This means that starting from an actuation of the interlocking shifting element with an actuating pressure p_F which acts in the closing direction of the interlocking shifting element F, the actuating pressure p_F can only be adjusted to a pressure level at which the interlocking shifting element F is moved in its opening direction after the lapse of a preferably temperature-dependent reaction time.

In the present case, at time T3 the displaceable shifting element half of the interlocking shifting element F is, in relation to the non-displaceable shifting element half, in a position starting from which the displaceable shifting element half, despite an abrupt reduction in the actuating pressure p_F by the hydraulic actuating system, is brought into mutual contact with the non-displaceable shifting element half of the interlocking shifting element F either at least in the area of their end surfaces that face one another or even so that it engages with the latter with interlock, which however, conflicts with the requirement for the closing phase of the interlocking shifting element to be interrupted, for example due to a command for a shift in the direction of the fifth gear "5" for forward driving.

If the shift is nevertheless interrupted and for example the shifting element B previously to be disengaged is not opened, and at the same time in the area of the shifting element F previously to be engaged a contact between the shifting element halves of the interlocking shifting element exists because of the delay of the hydraulic actuation, such that torque is transmitted in the area of the interlocking shifting element F, then in the area of the transmission device 1 stress conditions arise which are undesired and which in some circumstances obstruct the proper functioning of the transmission device.

In the method according to the invention, to avoid such undefined operating conditions in the transmission device 1 if it becomes necessary to interrupt the previously commanded downshift from the current gear "5" to the target gear "4", it is provided that from when the time point T3 which varies as a function of the operating temperature of the transmission device 1 at the time has been reached, the required gearshift and thus the closing phase of the interlocking shifting element F is fully implemented despite the interruption command and the interlocking shifting element F is brought to its closed operating condition.

Thereafter it is possible to carry out an upshift, again starting from the fourth gear "4" toward the fifth gear "5", in order to produce the operating condition of the transmission device 1 aimed at by the interruption command.

Alternatively to or cumulatively with this, in a variant of the method according to the invention it is provided that the force flow in the transmission device 1 is interrupted by opening at least one of the shifting elements A or E at the same time as the shifting element B is open, in order to change the transmission device 1 to a neutral operating condition in which essentially no torque can be transmitted via the transmission device 1 from the driveshaft 2 toward the drive output shaft 3 or in the reverse direction, in order reliably to avoid stress conditions in the area of the transmission device 1 that impair the driving comfort.

Thereafter the fifth gear "5" can be engaged again in the transmission device 1 in order to produce in the transmission device 1 the operating condition aimed at by the interruption command.

If a corresponding command for the interruption of the previously commanded downshift from the fifth gear "5" toward the fourth gear "4" occurs before the time T3, the closing phase of the interlocking shifting element F can be interrupted without producing an undefined operating condition in the transmission device 1.

At a time T4 the displaceable shifting element half of the interlocking shifting element F is, relative to the non-displaceable shifting element half of F, in a position where the shifting element halves of the interlocking shifting element F come in contact with one another without an interlocked connection in the area of the end surfaces that face one another. Starting from the position of the displaceable shifting element half of the interlocking shifting element F at time T4, any farther axial movement of the displaceable shifting element half toward the non-displaceable shifting element half results in the formation of interlock between the shifting element halves of the interlocking shifting element F, whereby at a time T5 when the displaceable shifting element half reaches its second end position equivalent to the fully closed operating condition of the interlocking shifting element F, the interlocking shifting element F is fully closed.

The point-of-no-return defined in this cast at time T3 is taken into account for the method according to the invention if the torque currently being transmitted by the interlocking shifting element F is not known, since then the shifting forces required for opening the interlocking shifting element F starting from a tooth-on-tooth position or starting from an interlocked operating condition of the interlocking shifting element F, in which the torque is transmitted by an at least partially formed interlock between the shifting element halves of the interlocking shifting element F, cannot be determined.

If in addition to the position sensor device, a torque sensor device is associated with the interlocking shifting element F, by means of which a torque currently being transmitted by the interlocking shifting element F can be determined, then the point-of-no-return of the interlocking shifting element can be varied as a function of the torque currently being transmitted by the interlocking shifting element F. Thus for example, if the torque values transmitted by the interlocking shifting element F are small it is possible to change the interlocking shifting element F to its open operating condition by means of small shifting forces even if there is an interlock, without producing undefined operating conditions in the area of the transmission device 1.

Beyond a torque threshold of the torque currently being transmitted by the interlocking shifting element F, the interlocking shifting element F can no longer be changed to its open operating condition sufficiently reliably, and accordingly the point-of-no-return is earlier in time than a point-of-no-return determined for currently transmitted torque values below the torque threshold.

If only a torque sensor device is associated with the interlocking shifting element F, by which the torque currently being transmitted by the interlocking shifting element F can be determined, then the current operating condition of the interlocking shifting element F is determined as a function of the torque currently transmitted by the interlocking shifting element F and the required gearshift from the fifth gear "5" toward the fourth gear "4" is interrupted if the currently determined torque value is smaller than a defined torque threshold. In contrast, if a torque currently transmitted by the interlocking shifting element F is determined to be greater than or equal to the defined torque threshold, the required gearshift from the currently engaged gear "5" toward the target gear "4" is carried out to completion and/or the force flow in the area of the transmission device 1 is interrupted, preferably by disengaging or opening the closed shifting elements A, E and B so that the transmission device 1 is changed to the neutral operating condition. In this case, in a preferred variant of the method according to the invention, the torque threshold is essentially at least approximately equal to zero.

Alternatively to the possibilities described above for determining the point-of-no-return of the interlocking shifting element F, the point-of-no-return can also be determined by way of a pressure sensor device associated with the interlocking shifting element F, by means of which the actuating pressure p_F currently applied at the interlocking shifting element F can be determined, whereby the current operating condition of the interlocking shifting element F is determined as a function of the currently applied actuating pressure p_F.

If a value of the actuating pressure p_F is determined to be above a defined pressure threshold the gearshift commanded at time T1 toward the target gear "4" is carried out, whereas if the actuating pressure is lower than or equal to the defined pressure threshold the gearshift commanded toward the target gear "4" is interrupted. Since in this case the actuating pressure p_F is either equal to zero or is at the closing pressure value of the interlocking shifting element F, the point-of-no-return is generally determined by way of the pressure sensor device as the time from which the interlocking shifting element F is acted upon by an actuating pressure. This means that the pressure threshold is essentially equal to zero and that the required interruption of the gearshift toward the target gear "4" no longer takes place already at time T2. Thus, a point-of-no-return determined by using the pressure sensor device occurs much earlier compared with when it is determined by means of the pressure sensor device and/or the torque sensor device.

As another alternative to the above, in a further variant of the method according to the invention the point-of-no-return is determined by way of a rotational speed sensor with which a rotational speed difference between the shifting element halves of the interlocking shifting element F can be determined, whereby the current operating condition of the interlocking shifting element F and the point-of-no-return are then determined as a function of the current rotational speed difference.

If a current rotational speed difference between the shifting element halves is, or is determined to be larger than a defined speed threshold of the speed difference between the shifting element halves, the gearshift commanded at time T1 toward the target gear "4" is interrupted, whereas if the current speed difference between the shifting element halves is smaller than or equal to the defined speed threshold of the speed difference between the shifting element halves, the gearshift commanded toward the target gear "4" is carried out.

In a preferred variant of the method according to the invention the rotational speed threshold is essentially at least approximately equal to zero, whereas the point-of-no-return determined can be disregarded again if the interlocking shifting element F shows an operating condition variation in which the speed difference between the shifting element halves of the interlocking shifting element F is at least approximately equal to zero but the interlock in the area of the interlocking shifting element F has not yet been formed. Such an operating condition variation occurs when there is in the area of the interlocking shifting element F a so-termed zero-passage condition owing to a corresponding actuation of the frictional shifting element B that is to be disengaged.

As a function of the respective predefined value of the speed threshold of the rotational speed difference, the point-of-no-return is determined within a speed window around the zero-passage of the interlocking shifting element F. If, during a further interrogation step later than the interrogation step previously carried out, a speed difference larger than the speed threshold is determined, the previously determined point-of-no-return is reset again and a current operating condition of the interlocking shifting element F is determined, starting from which the gearshift called for at time T1 toward the target gear "4" can be interrupted without producing an undefined operating condition in the area of the transmission device 1.

The above-described variants of the method according to the invention are also suitable for determining the point-ofno-return of interlocking shifting elements in which both shifting element halves are designed to be displaceable.

INDEXES

1 Transmission device
2 Drive input shaft
3 Drive output shaft
"1" to "9" Gear for forward driving
A to F Shifting element
$n\_A$, $n\_F$ Rotational speed difference at the interlocking shifting element A or F
$p\_A$, $p\_F$ Actuating pressure
P1 to P4 Planetary gearset
"R" Reversing gear
SA, SF Variation of the shift command
STA, STF Variation of the position of the shifting element half of the interlocking shifting element A or F designed to be displaced
t Time
T1 to T5 Discrete time point

The invention claimed is:

1. A method of operating a transmission device of a vehicle drive-train which comprises a plurality of frictional shifting and at least one interlocking shifting element, having first and second mating halves, which are either engaged or disengaged to obtain various gears, the method comprising the steps of:
    initiating a required gearshift from a current gear in which the interlocking shifting element is disengaged, to a target gear, in which the interlocking shifting element is engaged;
    determining, before the required gearshift is completed, if it is necessary to re-engage the current gear in the transmission;
    determining a current operating condition of the interlocking shifting element based on an axial relationship of the first and the second mating halves of the interlocking shifting element with respect to one another;
    terminating the required gearshift and re-engaging the current gear if both:
        a) it is determined that it is necessary to re-engage the current gear in the transmission, and
        b) based on the current operating condition of the interlocking shifting element, the engagement of the target gear can be interrupted;
    while completing the required gearshift if both:
        a) it is determined that it is necessary to re-engage the current gear in the transmission, and
        b) based on the current operating condition of the interlocking shifting element, the engagement of the target gear cannot be interrupted.

2. The method according to claim 1, further comprising the step of
    during the engaging phase of the interlocking shifting element, producing an interlock, between two shifting element halves of the interlocking shifting element, by a relative movement in an axial direction between the shifting element halves, and
    determining the current operating condition of the interlocking shifting element by a position sensor device for determining, in each case, a current axial position of the shifting element halves relative to one another.

3. The method according to claim 2, further comprising the step of interrupting the required gearshift toward the target gear before reaching a defined axial position between the shifting element halves.

4. The method according to claim 2, further comprising the step of carrying out the required gearshift toward target gear if a defined axial position between the shifting element halves is reached.

5. The method according to claim 1, further comprising the step of associating a torque sensor device with the interlocking shifting element by which a torque, currently transmitted by the interlocking shifting element, can be determined, and determining the current operating condition of the interlocking shifting element as a function of the said currently transmitted torque.

6. The method according to claim 5, further comprising the step of, if the torque currently transmitted by the interlocking shifting element is determined to be smaller than a defined torque threshold, interrupting the required gearshift toward the target gear.

7. The method according to claim 6, further comprising the step of, if the torque currently transmitted by the interlocking shifting element is determined to be greater than or equal to the defined torque threshold, carrying out the required gearshift toward the target gear.

8. The method according to claim 1, further comprising the step of associating a rotation speed sensor device with the interlocking shifting element by which a speed difference between the shifting element halves of the interlocking shifting element is determined, and determining the current operating condition of the interlocking shifting element as a function of the currently existing rotation speed difference.

9. The method according to claim 8, further comprising the step of, if the current speed difference between the said shifting element halves is greater than a defined speed threshold of the speed difference between the shifting element halves, interrupting the required gearshift toward the target gear.

10. The method according to claim 9, further comprising the step of, if the current speed difference between the shifting element halves is smaller than or equal to the defined speed threshold of the rotation speed difference between the shifting element halves, carrying out the required gearshift toward the target gear.

11. The method according to claim 1, further comprising the step of associating a pressure sensor device with the interlocking shifting element by which an actuating pressure, currently applied at the interlocking shifting element, is determined, and determining the current operating condition of the interlocking shifting element as a function of the currently applied actuating pressure.

12. The method according to according to claim 11, further comprising the step of, if the actuating pressure is greater than a defined pressure threshold of the actuating pressure of the interlocking shifting element, carrying out the required gearshift toward the target gear.

13. The method according to claim 12, further comprising the step of, if the actuating pressure is smaller than or equal to a defined pressure threshold, interrupting the required gearshift toward the target gear.

14. A method of operating a transmission device of a vehicle drive-train which comprises a plurality of frictional shifting elements and at least one interlocking shifting element, having first and second mating halves, which are either engaged or disengaged to obtain various gears, the method comprising the steps of:
    initiating a required gearshift from a current gear in which the interlocking shifting element is disengaged, to a target gear, in which the interlocking shifting element is engaged;

determining, before the required gearshift is completed, if it is necessary to re-engage the current gear in the transmission;

determining a current operating condition of the interlocking shifting element based on an axial relationship of the first and the second mating halves of the interlocking shifting element with respect to one another;

if it is determined that it is necessary to re-engage the current gear in the transmission,
  a) terminating the required gearshift and re-engaging the current gear if, based on the current operating condition of the interlocking shifting element, the engagement of the target gear can be interrupted; while
  b) completing the required gearshift and interrupting a force flow if, based on the current operating condition of the interlocking shifting element, it is determined that the engagement of the target gear cannot be interrupted, and, thereafter, immediately disengaging the interlocking shifting element, engaged for the target gear, and re-engaging the current gear.

15. A method of operating a vehicle drive-train transmission device having a plurality of frictional shifting elements and at least one interlocking shifting element which are selectively engaged to implement various gears, the method comprising the steps of:

initiating a required gearshift from a current gear, in which the interlocking shifting element is disengaged, to a target gear, in which the interlocking shifting element is to be engaged;

determining, before the required gearshift is completed, if it is necessary to re-engage the current gear in the transmission;

determining a point of no return for interrupting engagement of the interlocking shifting element,
  the point of no return being an axial spacing between two halves of the interlocking shifting element at which an instruction issued, to terminate the required gearshift, cannot be implemented without at least a partial engagement of the two halves of the interlocking shifting element with one another;

terminating the required gearshift when both (a) it is determined that it is necessary to re-engage the current gear and (b) the two halves of the interlocking shifting element are spaced from one another by a distance greater than the point of no return; and completing the required gearshift and interrupting force flow when both (a) it is determined that it is necessary to re-engage the current gear, and b) the two halves of the interlocking shifting element are spaced from one another at or less than the point of no return.

16. The method according to claim 15, further comprising the step of determining the point of no return being based at least partially on an operating temperature of the transmission device.

17. The method according to claim 15, further comprising the step of determining the point of no return as a function of a speed difference between the two halves of the interlocking shifting element.

18. The method according to claim 15, further comprising the step of disregarding the point of no return if a difference of speed between two halves of the interlocking shifting element is substantially equal to zero.

19. The method according to claim 15, further comprising the step of completing the required gearshift when both: a) it is determined that it is necessary to re-engage the current gear, and b) the two halves of the interlocking shifting element are spaced from one another at or less than the point of no return.

20. The method according to claim 15, further comprising the step of interrupting force flow when both: a) it is necessary to re-engage the current gear, and b) the two halves of the interlocking shifting element are spaced from one another at or less than the point of no return.

* * * * *